Figure 1:
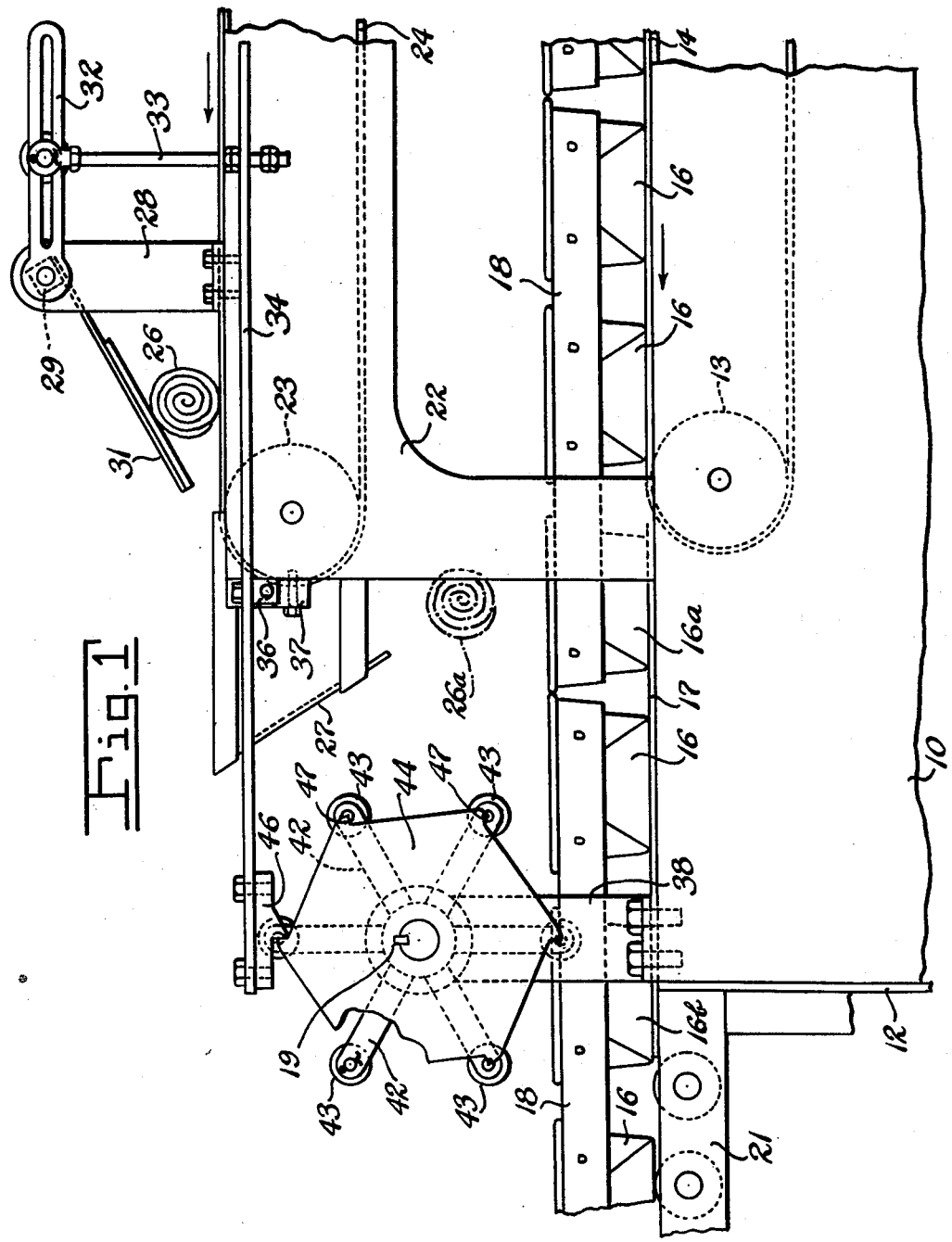

June 2, 1953 — W. BAECHLE — 2,640,637
MACHINE FOR LOADING BAKING PANS
Filed Feb. 23, 1950 — 2 Sheets-Sheet 2

INVENTOR.
WALTER BAECHLE
BY Zugelter & Zugelter
Attys.

Patented June 2, 1953

2,640,637

UNITED STATES PATENT OFFICE 2,640,637

MACHINE FOR LOADING BAKING PANS

Walter Baechle, Cincinnati, Ohio, assignor to The J. H. Day Company, Cincinnati, Ohio, a corporation of Ohio Application February 23, 1950, Serial No. 145,847

2 Claims. (Cl. 226—2)

This invention relates to a machine for loading bread dough or the like in baking pans and more particularly relates to a machine for automatically advancing units of bake pans each of which may include a plurality of pans, one pan width at a time intermittently past a loading station so that each pan receives a lump of dough as it moves past the loading station.

An object of this invention is to provide a machine which automatically advances and stops bread pans one at a time at a loading station and drops a loaf or lump of dough into each pan while at rest at the loading station.

A further object of this invention is to provide a machine for loading loaves or lumps of dough into baking pans in which machine dough loaves are advanced to a position above a loading station and dropped into baking pans as the pans are arrested at the loading station.

A further object of this invention is to provide a machine for loading dough loaves into baking pans in which the dough loaves are carried past a stop releasing member which releases a pan to advance to the loading station where the pan is arrested before the dough loaf drops from the dough conveyor to the pan.

A further object of this invention is to provide a machine of this type having a stop member at a pan holding station on the pan conveyor beyond the loading station at which a loaded pan is arrested to halt a row of following pans on the conveyor including a pan at the loading station.

A further object of this invention is to provide a pan stopping member in a machine of this type having a plurality of pan stopping arms each adapted to extend a limited distance into a loaded pan insufficient to substantially displace a dough loaf in the pan to halt the pan at the pan holding station.

A further object of this invention is to provide a pan stopping member of this type equipped with a star wheel and a pawl releasable as a dough loaf travels along the dough conveyor to permit a pan at the pan loading station to be released, the pan stopping member being adapted to arrest the next following pan as it reaches the pan holding station so that a pan is advanced to the pan loading station when the pawl is released.

A further object of this invention is to provide a mechanism for automatically timing intermittent movement of bake pans over a continuously moving conveyor with respect to the movement of individual lumps or loaves of dough moving on a superposed conveyor so that the movement of the pans is arrested at the time a dough lump is discharged from its conveyor at such a position that each pan receives a loaf or lump of dough.

Figure 2:
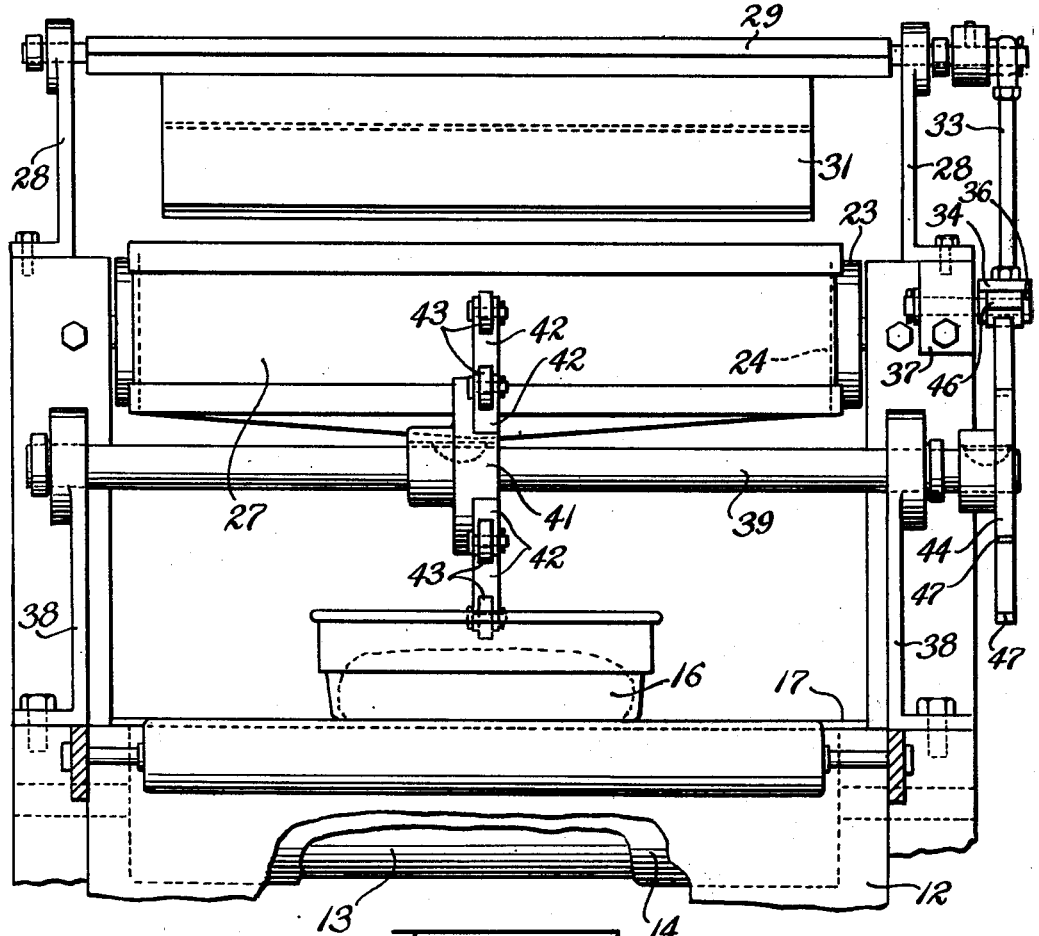

The above and other objects and features of the invention will in part be apparent and will in part be obvious from the following detailed description and the drawings, in which:

Figure 1 is a view in side elevation showing a pan loading machine constructed in accordance with an embodiment of this invention; and Fig. 2 is a view in end elevation of the machine illustrated in Fig. 1, the conveyor for receiving pans from the pan loading machine being shown in section, a part of an end plate of the machine being broken away to reveal structural details.

In the following detailed description and the drawings, like reference characters indicate like parts.

As shown in the drawings the machine includes a framework comprising a pair of side members 10 and a front plate 12 extending between the side members 10. A roll 13 extends between and is rotatably supported in the side members 10. A belt 14 runs on roll 13 and conveys bread bake pan units tandemwise in the direction indicated. Each unit includes a plurality of individual baking pans 16. The belt 14 delivers the pans 16 onto a table 17 along which they are moved by the pans on the conveyor belt.

The baking pans may be of the type commonly used in baking bread, and a plurality of pans may be joined together to form the pan units by means of pan straps 18. The pans are advanced by the belt 14 one after another, and as the pans leave the belt, the pans are driven past a loading station and a pan holding station. A pan at the loading station is indicated at 16a, while a pan at the pan holding station is indicated at 16b. A stop member, indicated generally at 19 in Fig. 1 is adapted to engage each pan as it reaches the pan holding station to arrest movement of the entire group of pans on the table 17. The belt 14 is not stopped so that when the pans are stopped they slide relative to the belt. When movement of the pans is arrested, one of the individual pans will be in positiion to receive a lump of dough as shown at 16a. The pans are advanced intermittently under the control of the pan stop member 19, in the path of the pans as they leave the loading station.

A dough conveyor framework 22 is mounted above the belt 14. The dough conveyor framework carries a roll 23 on which a dough conveyor belt 24 runs. The dough conveyor belt is adapted to carry a dough loaf 26 to a position above the pan at the loading station 16a, and the dough loaf falls from the dough conveyor 24 into the pan at the loading station 16a. A dough loaf is indicated at 26a in its position immediately before reaching the pan at the loading station 16a. A dough loaf guiding member 27 is attached to the dough conveyor framework 22 opposite the roll 23 and is adapted to guide dough loaves and direct them into the pan at the loading station 16a.

Release frame members 28 are attached to and extend upwardly from the dough conveyor framework a short distance ahead of the roll 23. The support members 28 rotatably support a transverse bar 29 to which is attached a release flap 31. As shown in the drawings, the release flap 31 is disposed in the path of the dough loaves on the dough conveyor belt 24, and the release flap normally is held inclined to the horizontal as shown in Fig. 1, so that, when a dough loaf comes against the release flap, the dough loaf raises the release flap to swing the bar 29 in a clockwise direction as shown in Fig. 1. When the loaf has passed beyond the flap 31, the flap returns to its normal position. A crank 32 is attached to the bar 29 to swing with the release flap. A link 33 extends between the crank 32 and an elongated pawl carrying rod 34. The pawl carrying rod 34 in turn is pivotally attached to the dough conveyor framework. A pivot lug 36 is rotatably mounted on an ear 37 attached to the dough conveyor framework 22. The pawl carrying rod 34 is attached to the lug 37, as clearly shown in the drawings and swings about the axis of the lug 37. The rod 34 and associated linkage connects the flap 31 with the stop member 19 whereby the member 19 is released when the flap is lifted to allow the pans to move. As soon as the flap returns, the dough loaf having passed under it, the stop member 19 immediately is locked and pan movement is arrested. While the pans are at rest, the dough loaf drops into the pan at the loading station 16a.

The stop member 19 is carried by upstanding support arms 38 attached to the side members 10. A shaft 39 is rotatably mounted in the upstanding arms 38. The shaft 39 carries and is keyed to the hub of a pan arresting element 41 (Fig. 2). The element 41 carries a plurality of radially directed stop arms 42 (Figs. 1 and 2) which are equally spaced about the hub. Rollers 43 are rotatably mounted at the ends of the stop arms.

A star wheel 44 is also keyed to the shaft 39 at one end thereof, and a pawl 46 attached to the pawl carrying rod 34 is adapted to engage teeth 47 of the star wheel to hold the shaft 39 and stop arms 42 stationary. As shown in the drawings, each of the stop arms 42 is adapted to extend a short distance into a baking pan at the pan holding station 16b. However, the arms do not extend to the bottoms of the pans so that loaded pans can pass under the stop member 41 and be arrested thereby without the stop arms substantially displacing dough loaves in the pans. As shown in Fig. 1, the spacing between stop arms 42 is sufficient so that, when the pawl is released to permit the star wheel to advance one tooth, the stop arms release the pan at the pan holding station but catch and arrest the next succeeding pan as the pans are pushed beneath the pan arresting member.

Pans may be placed on the belt 14 ahead of the loading stations and, as indicated at 48, the dough conveyor support framework is cut away to provide a space for inserting pans as the pans are advanced by the belt 14. The belt 14 may be made of material which can slide beneath the pans when a pan is held by the stop member. The belts 14 and 24 may be continuously driven by driving rolls, not shown and, each time a dough loaf advances along the belt 24 to pass the release flap 31 a pan held by the pan holding member is released to pass onto the roller conveyor 21 and the next succeeding pan is arrested by the pan holding member so that the pan at the loading station when the release flap is raised can advance toward the pan holding station 16b, and a new and empty baking pan can advance to the loading station before the dough loaf is dropped from the dough conveyor belt 24 to the pan at the loading station. The machine automatically loads one dough loaf into each pan and then advances the pans onto the roller discharge conveyor 21. The dough loaves may be formed in any appropriate machine and deposited on the dough conveyor to advance along the dough conveyor one at a time. The baking pans advance intermittently along the belt 14 and across the table 17 one after another, and a pan is advanced to the loading station only when a dough loaf raises the release flap 31. The pan conveyor belt advances continuously, and when the pans are held by the pan stop member 19, the belt 14 slips beneath the pans.

The machine illustrated in the drawings and described above is subject to structural modification without departing from the spirit and scope of the appended claims.

Having described my invention, what I claim as new and desire to secure by Letters Patent is:

1. In a machine for loading dough loaves in pans, the combination of an endless type pan feeding conveyor for advancing baking pans one after another to pass a loading station, an endless type dough conveyor mounted above the pan feeding conveyor and having a discharge end above the loading station, the dough conveyor being adapted to release dough loaves above the loading station one at a time, a releasable stop member mounted above the pan conveyor at a pan holding station beyond the loading station and comprising a plurality of stop arms each adapted to extend a limited distance into one of the pans when the pan is at the pan holding station to halt another of the pans at the loading station, a release flap mounted above the dough conveyor in the path of dough loaves on the dough conveyor, said release flap being displaceable by a dough loaf traveling along said dough conveyor, and a mechanical linkage between the flap and the pan stop including a star wheel associated with said pan stop and a pawl adapted for cooperative engagement with said star wheel, said pawl being moveable in response to displacement of said flap, said linkage being effective to release the pan stop when a dough loaf displaces the release flap and thereby to release the pan at the pan holding station to permit the pan at the loading station to advance toward the pan holding station, the stop being adapted to arrest a succeeding pan at the pan holding station to arrest a succeeding pan at the loading station when the dough conveyor releases the dough loaf above the loading station, whereby the dough loaf falls into the last mentioned pan.

2. In a machine for loading dough loaves in pans, the combination of an endless belt-type conveyor for advancing baking pans one after another to pass a loading station, an endless belt-type dough conveyor mounted above the pan conveyor and having a discharge end above the loading station, the dough conveyor being adapted to release dough loaves above the loading station one at a time, a stop member rotatably mounted above the pan conveyor at a pan holding station beyond the loading station, the axis of said stop member extending transversely of the pan conveyor, said stop member including a plurality of radial arms, each of said arms being adapted to extend downwardly into one of the pans on the conveyor an insufficient distance to substantially displace a dough loaf in the pan when the pan is at the pan holding station to arrest another of the pans at the loading station, a star wheel attached to and coaxial with said stop member, the number of arms of the stop member being equal to the number of teeth on the star wheel, a release flap pivotally mounted above the dough conveyor in the path of dough loaves on the dough conveyor, said release flap being adapted to swing away from the dough conveyor when a dough loaf on the dough conveyor is brought into engagement therewith, a pawl, said pawl normally engaging one of the teeth of star wheel to hold the star wheel and stop member against turning in pan advancing direction, a linkage between the release flap and the pawl for disengaging the pawl from the tooth of the star wheel when the release flap is swung away from the dough conveyor to permit the star wheel and the stop member to advance one tooth of the star wheel to release the pan at the pan holding station to permit the pan at the loading station to advance toward the pan holding station, the pawl being adapted to engage the succeeding tooth of the star wheel to arrest the succeeding pan at the pan holding station to arrest a succeeding pan at the loading station when the dough conveyor releases the dough loaf above the loading station, whereby the dough loaf falls into the last mentioned pan.

WALTER BAECHLE.

References Cited in the file of this patent

UNITED STATES PATENTS

| Number | Name | Date |
|---|---|---|
| 1,715,968 | Weber et al. | June 4, 1929 |
| 2,349,423 | Harber | May 23, 1944 |
| 2,536,249 | Archer | Jan. 2, 1951 |